(12) United States Patent
Sved

(10) Patent No.: US 6,958,873 B2
(45) Date of Patent: Oct. 25, 2005

(54) DATA REWRITE CONTROL IN DATA TRANSFER AND STORAGE APPARATUS

(75) Inventor: Jorge Antonio Sved, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 606 days.

(21) Appl. No.: 09/917,853

(22) Filed: Jul. 31, 2001

(65) Prior Publication Data

US 2003/0030932 A1 Feb. 13, 2003

(51) Int. Cl.$^7$ .................................................. G11B 5/09
(52) U.S. Cl. ......................... 360/53; 360/48; 714/701; 714/719
(58) Field of Search ..................... 360/48, 53; 714/701, 714/719

(56) References Cited

U.S. PATENT DOCUMENTS

| | | |
|---|---|---|
| 3,641,534 A | 2/1972 | Irwin |
| 3,893,072 A | 7/1975 | D'Antonio et al. |
| 4,001,883 A | 1/1977 | Strout et al. |
| 4,390,909 A | 6/1983 | Sakamoto |
| 4,559,568 A | 12/1985 | Watanabe et al. |
| 4,604,657 A | 8/1986 | Fukami et al. |

(Continued)

FOREIGN PATENT DOCUMENTS

| | | |
|---|---|---|
| EP | 0286412 | 10/1988 |
| EP | 0624875 | 11/1994 |
| EP | 0831482 | 3/1998 |
| EP | 0913826 | 5/1999 |
| EP | 0936618 | 8/1999 |
| EP | 0944199 | 9/1999 |
| EP | 0957484 A1 | 11/1999 |
| EP | 0984451 A1 | 3/2000 |
| WO | 97/04454 | 2/1997 |
| WO | 99/50850 | 10/1999 |

OTHER PUBLICATIONS

"New 8 mm Is Ideal for Automated Storage," J. Gast, *Computer Technology Review* Mar. 11, (1991) No. 3, pp. 26, 28–29.
"Construction of Error Resilient Synchronization Codeword for Variable-Length Code in Image Transmission," Department of Electronics Engineering, by Yew–San et al., 2000, IEEE, pp. 360–363.

*Primary Examiner*—David Hudspeth
*Assistant Examiner*—Dan I Davidson

(57) ABSTRACT

Apparatus for transferring data from a host computing system to one or more magnetic tape storage devices or the like, the apparatus comprising input apparatus for receiving data and converting it into codeword pairs in a format suitable for storage on the tape, a write head for writing the codeword pairs in codeword quad (CQ) sets of 2×8 codeword pairs to the tape, a read head for reading back data written to the tape and transferring the read data to an error checking block which is arranged to generate a negative output if a codeword pair includes an error and/or more than a predetermined number of errors, and control apparatus for causing the write head to rewrite a CQ set to the tape in response to a negative output from the error checking block, the control apparatus being configured or configurable to rewrite a CQ set to the tape until all of the codeword pairs (or CQ's) in that CQ set are written without error (or less than a predetermined number of errors) during the same rewrite, thereby maximizing the quality of the stored data and minimizing the probability that data will not be recoverable from the tape when required. In a preferred embodiment, the apparatus includes a control register having a number of bits which, if set to 1, cause CQ sets to be rewritten if any of its CQ's are bad, irrespective of the number of previous rewrites.

24 Claims, 4 Drawing Sheets

U.S. PATENT DOCUMENTS

| | | | |
|---|---|---|---|
| 4,700,240 A | 10/1987 | Umemoto et al. | |
| 4,829,525 A | 5/1989 | Sugiyama et al. | |
| 4,835,628 A | 5/1989 | Hinz et al. | |
| 4,862,295 A | 8/1989 | Tanaka et al. | |
| 4,862,443 A | 8/1989 | Tsuji et al. | |
| 5,012,459 A | 4/1991 | Odaka et al. | |
| 5,293,285 A | 3/1994 | Leonhardt et al. | 360/95 |
| 5,339,108 A | 8/1994 | Coleman et al. | |
| 5,353,175 A | 10/1994 | Chiba | |
| 5,369,652 A | 11/1994 | Bailey et al. | |
| 5,371,745 A | 12/1994 | Kiyonaga et al. | |
| 5,384,669 A | 1/1995 | Dunn et al. | |
| 5,396,374 A | 3/1995 | Kubota et al. | |
| 5,408,366 A | 4/1995 | Bentley et al. | |
| 5,416,782 A | 5/1995 | Wells et al. | 714/719 |
| 5,434,719 A | 7/1995 | Miller et al. | |
| 5,446,604 A | 8/1995 | Chiba | |
| 5,450,250 A | 9/1995 | Garcia et al. | |
| 5,465,159 A | 11/1995 | Ohashi | |
| 5,467,360 A | 11/1995 | Lokhoff | |
| 5,485,321 A | 1/1996 | Leonhardt et al. | |
| 5,485,476 A | 1/1996 | Paraujape et al. | |
| 5,491,590 A | 2/1996 | Endo et al. | |
| 5,543,977 A | 8/1996 | Shih et al. | |
| 5,576,903 A | 11/1996 | Brown et al. | 360/48 |
| 5,589,995 A | 12/1996 | Saito et al. | |
| 5,633,855 A | 5/1997 | Naito | |
| 5,675,447 A | 10/1997 | Goleer et al. | |
| 5,719,717 A | 2/1998 | Leonhardt et al. | |
| 5,729,408 A | 3/1998 | Kikitsu | |
| 5,731,922 A | 3/1998 | Yamasaki et al. | |
| 5,818,654 A | 10/1998 | Reddy et al. | |
| 5,844,920 A | 12/1998 | Zook et al. | |
| 5,847,890 A | 12/1998 | Hattori | |
| 5,905,600 A | 5/1999 | Nieuwkerk | |
| 5,940,233 A | 8/1999 | Malone, Sr. | |
| 5,969,649 A | 10/1999 | Ashley et al. | |
| 5,974,581 A | 10/1999 | Nagai et al. | 714/755 |
| 5,999,110 A | 12/1999 | Blaum et al. | |
| 6,018,434 A | 1/2000 | Saliba | 360/77.13 |
| 6,049,654 A | 4/2000 | Furuta et al. | |
| 6,092,231 A | 7/2000 | Sze | 714/758 |
| 6,282,040 B1 | 8/2001 | Bartlett | |
| 6,288,862 B1 | 9/2001 | Baron et al. | |
| 6,367,047 B1 | 4/2002 | McAuliffe et al. | |
| 6,469,854 B1 | 10/2002 | Gill et al. | |
| 6,473,561 B1 | 10/2002 | Heo | |
| 6,522,831 B2 | 2/2003 | Tanaka et al. | |
| 6,532,128 B1 | 3/2003 | Bui et al. | |
| 6,539,514 B1 | 3/2003 | Bartlett | |
| 6,581,184 B1 | 6/2003 | Saeki et al. | 714/800 |
| 6,584,527 B2 | 6/2003 | Verinsky et al. | 710/305 |
| 6,854,527 B2 | 6/2003 | Verinsky et al. | |
| 6,640,326 B1 | 10/2003 | Buckingham et al. | |
| 6,650,495 B2 | 11/2003 | Gill et al. | |

| a | b | c | d | e | f |
|---|---|---|---|---|---|

FIG. 5

| Trk | W  N | 0  0ˣ | 0  1 | 0  2 | 1  0'ˣ | 1  3ˣ | 1  4 | 2  0" | 2  3'ˣ | 2  5 | 2  6 | 3  3'" | 3  7 | 3  8 | 3  9 |
|---|---|---|---|---|---|---|---|---|---|---|---|---|---|---|---|
| 0 |     | 0 | 9  | 18 | 1'  | 27 | 36 | 2"  | 29' | 45 | 54 | 30'" | 63 | 64 | 27 |
| 1 |     | 1 | 10 | 19 | 2'  | 28 | 37 | 3"  | 30' | 46 | 55 | 31'" | 56 | 65 | 74 |
| 2 | D   | 2 | 11 | 20 | 3'  | 29 | 38 | 4"  | 31' | 47 | 48 | 24'" | 57 | 66 | 75 |
| 3 | S   | 3 | 12 | 21 | 4'  | 30 | 39 | 5"  | 24' | 40 | 49 | 25'" | 58 | 67 | 76 |
| 4 | S   | 4 | 13 | 22 | 5'  | 31 | 32 | 6"  | 25' | 41 | 50 | 26'" | 59 | 68 | 77 |
| 5 |     | 5 | 14 | 23 | 6'  | 24 | 33 | 7"  | 26' | 42 | 51 | 27'" | 60 | 69 | 78 |
| 6 |     | 6 | 15 | 16 | 7'  | 25 | 34 | 0"  | 27' | 43 | 52 | 28'" | 61 | 70 | 79 |
| 7 |     | 7 | 8  | 17 | 0'  | 26 | 35 | 1"  | 28' | 44 | 53 | 29'" | 62 | 71 | 72 |

FIG. 6

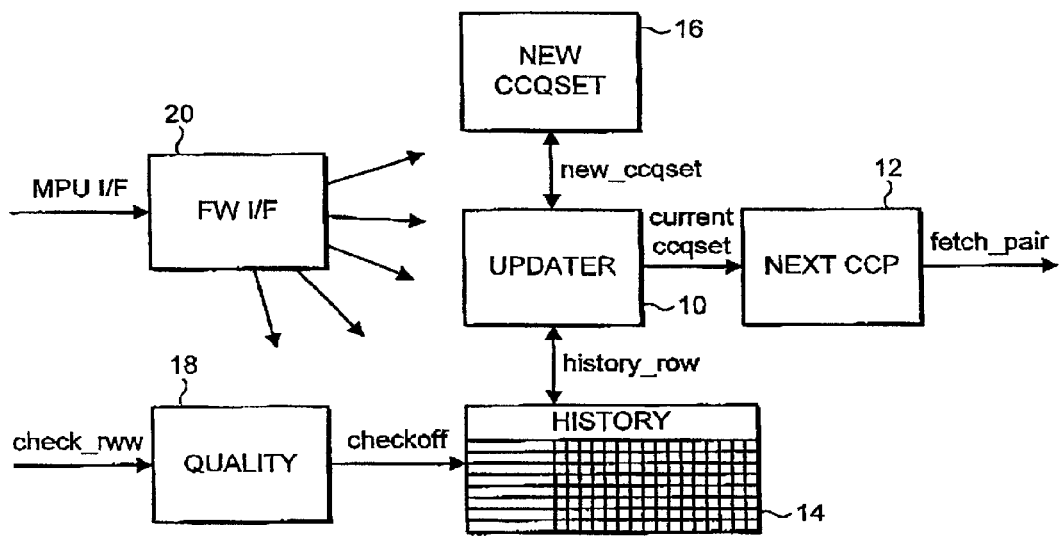

FIG. 7

| Bit name | Bit | Description |
|---|---|---|
| go | 0 | 1=>Enables the whole WCC Function |
|  | 2:1 | Unused now. Used to be *channels* and *odd_tracks* |
| reserved_bit | 3 | Header reserved bit (programme a 0 here) |
| strict_rewrites | 4 | 1=>CCQ Set always rewitten unless all its CCQs are good regardless of previous rewrites |
| latency (2:0) | 7:5 | Latency is the rewrite distance in intervening CCQ Sets between instances of the same CCQ Set |
| no_new_dataset | 8 | Write 0 here. (1 is only used for HW debug) |

FIG. 8

DATA REWRITE CONTROL IN DATA TRANSFER AND STORAGE APPARATUS

This invention relates generally to apparatus for transfer and storage of data and, in particular, to apparatus for the transfer and storage of data from a host computing system to a magnetic tape cartridge or the like.

In recent years, it has become increasingly common for companies and other such organisations to back-up their computing systems (and other in-house backup systems) by storing data on a series of magnetic tape cartridges, for retrieval in the event that the data is lost or corrupted in the primary systems.

An industrial format has been defined for this type of transfer and storage system, in which it is stated that, if a block of data is read back containing one byte in error, it must be rewritten. The industrial format defined for this type of data transfer and storage specifies that as long as all data bits making up a block of data are written correctly at least once, it is not necessary for all data bits to be written correctly on a given rewrite of the block of data. However, in some circumstances, such as the occurrence of a tape defect which spreads later or use of an inferior data reader, using this principle gives a significant possibility that data will not be recoverable from the tape storage means, when required.

We have now devised an arrangement which overcomes the problems outlined above.

SUMMARY OF THE INVENTION

In accordance with the present invention, there is provided apparatus for transferring data from a host computing system to one or more magnetic tape storage devices or the like, the apparatus comprising input apparatus for receiving data, dividing it into blocks, and converting said blocks of data to a format suitable for storage on said one or more storage devices, one or more data writers for writing said blocks of data in sets of a plurality of blocks to said one or more storage devices, one or more data readers for reading back data written to said one or more storage devices and transferring said read data to error checking means, said error checking apparatus being arranged to generate a negative output if a block of data includes an error and/or more than a predetermined number of errors, and control apparatus for causing said one or more data writers to rewrite a set of blocks of data to said one or more storage devices in response to a negative output from said error checking apparatus, said control apparatus being arranged to cause said one or more data writers to rewrite a set of blocks of data to said one or more storage devices until all of the blocks of data in that set are written without error (or with fewer than a predetermined number of errors) during the same rewrite.

Also in accordance with the present invention, there is provided a method of transferring data from a host computing system to one or more magnetic tape storage devices or the like, the method comprising the steps of receiving data and dividing it into blocks, converting said blocks of data to a format suitable for storage on said storage means, writing said blocks of data in sets of a plurality of blocks to said one or more storage devices, reading back data written to said one or more storage devices and transferring said read data to error checking apparatus, said error checking apparatus being arranged to generate a negative output if a block of data includes an error and/or more than a predetermined number of errors, and rewriting a set of blocks of data to said one or more storage devices in response to a negative output from said error checking apparatus until all of the blocks of data in that set are written without error (or with fewer than a predetermined number of errors) during the same rewrite.

The data is preferably written to the tape in codeword quad (or CQ) sets comprising an array, beneficially 2×8, of ECC encoded codeword pairs. The apparatus beneficially comprises a history store for storing information relating to at least some of the CQ sets written to the one or more storage devices together with information corresponding to the output of the error checking apparatus for each codeword pair of the set. Each CQ set is preferably identified in the history store by at least 47 bits of data, comprising 1 valid bit, 32 row quality bits (2 row quality bits per codeword pair), 1 dataset bit, 6 cqset bits, 4 acn bits and 3 rotation bits.

The row quality bits for each codeword pair are both beneficially set to 0 when a CQ set is first written to the one or more storage devices. The apparatus preferably includes detection apparatus for determining whether the header of a read codeword pair is correct and, if so, whether each codeword is good or bad, depending on the number of errors they contain, the apparatus further comprising apparatus for setting the row quality bits to indicate the result of such error checking. In a preferred embodiment, the row quality bits are set to 00 if the header of the codeword pair is corrupted (so that the codeword pair cannot be identified), 01 if the header is correct but both codewords are bad, 10 if the header is correct but only one of the codewords is good, and 11 if the header is correct and both codewords are good.

In a preferred exemplary embodiment of the present invention, the apparatus includes a control register including 1 or more (and more preferably 4) bits which can be set by a user to cause a CQ set to always be rewritten unless all of its CQ's are good, regardless of previous rewrites.

BRIEF DESCRIPTION OF THE DRAWINGS

An embodiment of the present invention will now be described by way of example only and with reference to the accompanying drawings, in which:

FIG. 5 is a schematic diagram illustrating the sequence in which data might be written to a magnetic tape head;

FIG. 6 is a table illustrating the operation of apparatus according to an exemplary embodiment of the present invention;

FIG. 7 is a schematic block diagram of apparatus according to an exemplary embodiment of the present invention;

FIG. 8 is a schematic diagram illustrating a programmable control register for use in apparatus according to an exemplary embodiment of the present invention.

DETAILED DESCRIPTION OF THE INVENTION

Figure 1:
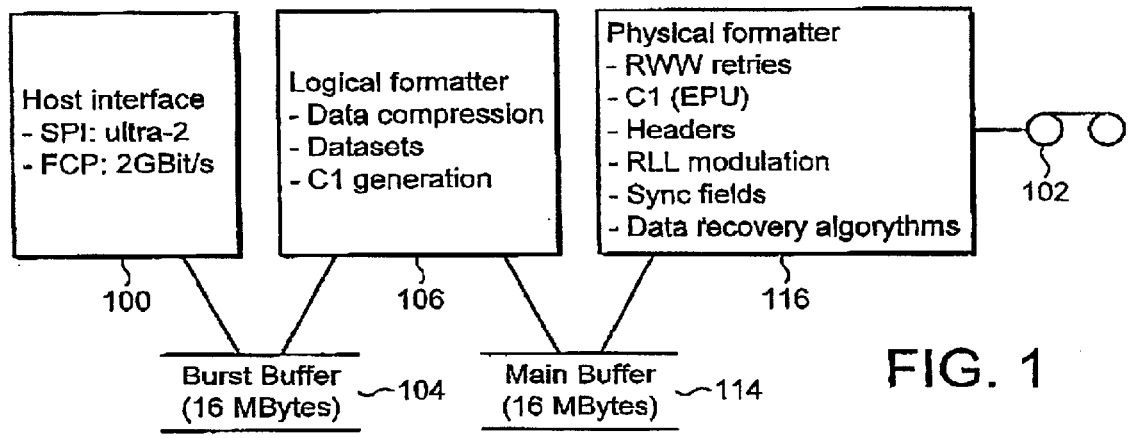
FIG. 1 is a schematic block diagram illustrating the flow of data from a host computing system through a magnetic tape drive according to an exemplary embodiment of the invention.

Referring to FIG. 1 of the drawings, there is illustrated schematically an exemplary system for transferring data from a host computing system 100 to a magnetic tape cartridge 102. Typically, data is output from the host computing system 100 in short, sharp bursts, whereas it is much more desirable to provide a steady stream of data to a read head for storage on a magnetic tape cartridge 102, in order to minimise wear on the read head motors and optimise the efficiency and storage capacity of the tape cartridge. Thus, data from the host computing system 100 is buffered in a burst buffer 104 before transfer to a logical formatter 106, where data is compressed and converted to a format suitable for storage on the magnetic tape cartridge 102. The logical formatter 106 arranges the data into 'datasets', as described below.

Figure 2:
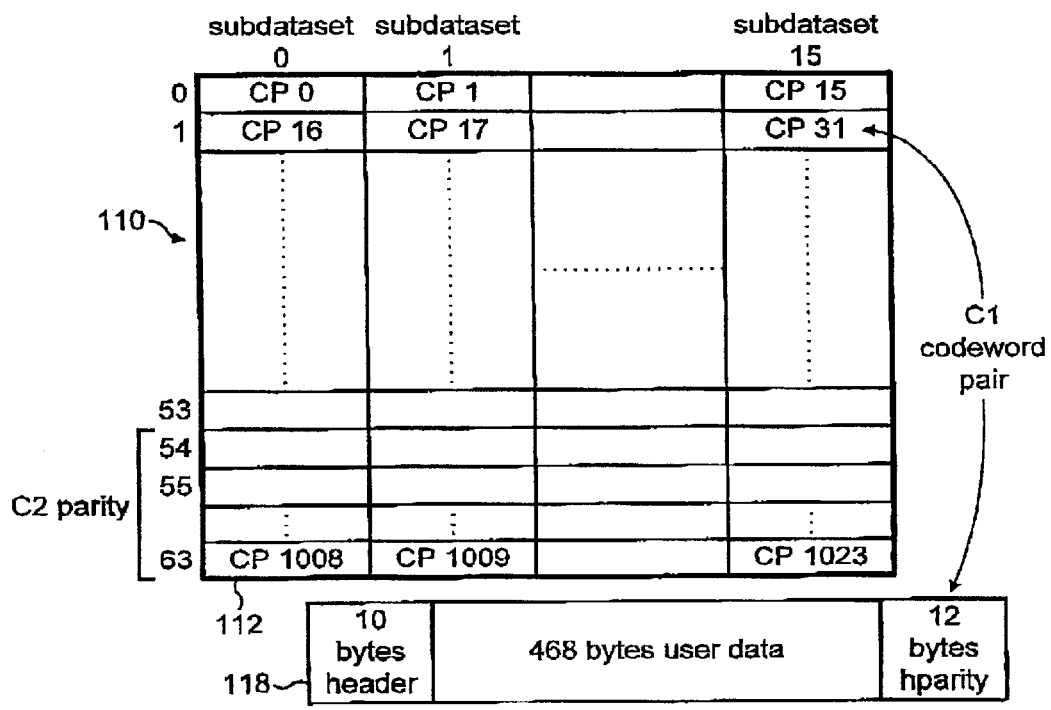
FIG. 2 is a schematic diagram illustrating the structure of a dataset.

Referring to FIG. 2 of the drawings, there is illustrated schematically a dataset 110, consisting of 16 sub datasets 112, each containing 54 rows of data. The data is arranged in the dataset 110 such that the first 468 bytes of a sequence of data are contained in the first row of the first sub dataset $112_{(0)}$, the next 468 bytes of data are contained in the second row of the first sub dataset $112_{(0)}$, and so on until the first sub dataset $112_{(0)}$ is full; then the next 468 bytes of data are contained in the first row of the second sub dataset $112_{(1)}$, etc., so that the last 468 bytes of data in a dataset are contained in tile last row of the sixteenth sub dataset $112_{(15)}$.

The datasets 110 are written sequentially into a main buffer 114. As each row of a dataset 110 is written into the main buffer 114, it is notionally split into two sets of data, and 6 parity bytes (Reed-Solomon) are added to each set by a C1 generator to produce two codewords. The bytes of the two codewords in each row are interleaved to produce a matrix of C1 codeword pairs (CCP's) which is stored in the main buffer 114 before transfer to a physical formatter 116.

Datasets 110 are taken sequentially from the main buffer 114 by the physical formatter 116 and written to the magnetic tape 102. Prior to writing the data to the tape 102, the physical formatter 116 adds a 10-byte header 118 to each CCP. It also notionally splits each sub dataset 112 into C2 codewords and adds 10 parity bytes to each. The header 118 consists of, among other things, a dataset number and a CCP designator to indicate which dataset a CCP comes from and where in that dataset the CCP was located. This information is important when it comes to retrieving the data from the magnetic tape. The physical formatter 116 also RLL (run length limited) encodes all data and adds synchronisation fields.

As described above, each row of the matrix is arranged such that it comprises one interleaved codeword pair, the even-numbered bytes forming the first codeword of the codeword pair and the odd-numbered bytes forming the second codeword of the codeword pair.

Figure 3:
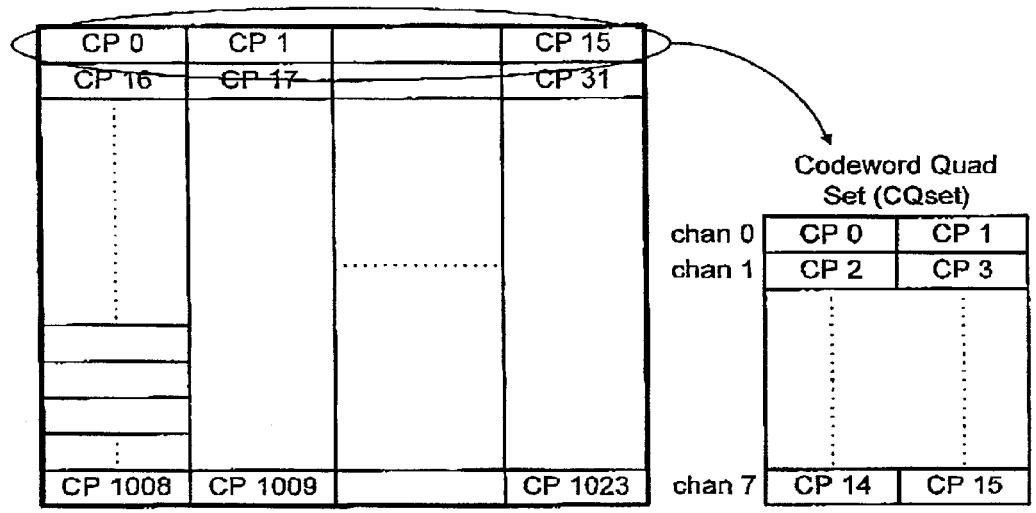
FIG. 3 is a schematic diagram illustrating the conversion of a dataset to a codeword quad.
Figure 4:
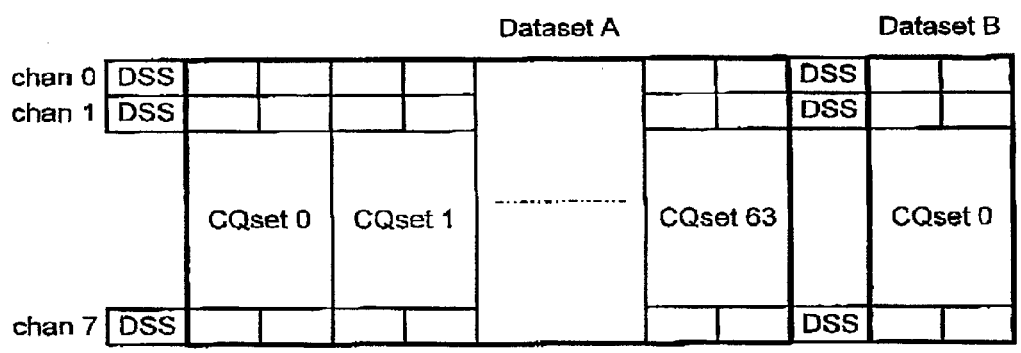
FIG. 4 is a schematic diagram illustrating the format of data written to a magnetic tape head.

In a tape drive according to an exemplary embodiment of the invention, there are eight parallel write heads or channels for simultaneously writing data along tape media. Thus, the physical formatter 116 includes a 'CQ writer', which takes each row of a dataset in turn, and converts it into a Codeword Quad (or CQ) set. Referring to FIG. 3 of the drawings, a CQ set comprises a 2×8 array containing the 16 CCP's in a row of a dataset. Each row of the CQ set is then written to tape via a respective one of the 8 channels. This has the benefit of spreading the C2 codewords along the the full physical length of a dataset on tape, thereby minimising the chance of media defects exceeding the C2 correction budget for any particular codeword. Thus, a dataset is written as 64 CQ sets, as shown in FIG. 4 of the drawings, and written to tape, each CQ set being separated by a DataSet Separator (or DSS) tone, the DSS consisting of a repeated binary pattern.

A read head (not shown) follows each write head to read back data just written to the magnetic tape so that the written data can be evaluated for quality. A C1 checker block checks the data read by the read head and determines whether or not there are any errors in the CCP's of each CQ set. If a codeword is found to contain no errors, the C1 checker block returns a positive output for that codeword. If, however, one or more errors are detected in a codeword, the checker block returns a negative output (C1 failure) for that codeword. A write chain controller (not shown) receives the output from the C1 checker block (known as the CCP RWW status) and, if a CCQ set contains one or more C1 failures, it causes that CCQ set to be rewritten. This process is known as Read While Write (RWW) Retry.

Obviously, there will be some latency, i.e. delay, between the write chain controller initially causing a CQ set to be written to tape, and receiving a negative output from the checker block for that CQ set. Thus, a number of intervening CQ sets will have been written to tape before the faulty CQ set is rewritten. Referring to FIG. 5 of the drawings, CQ sets a, b, c and d are sequentially written to tape. By the time CQ set d has been written to tape, the write chain controller has received a number of C1 failures from the C1 checker for CQ set b which exceeds the predetermined threshold, and causes this CQ set to be rewritten. It then resumes sequentially writing CQ sets e and f before receiving sufficient C1 failures (again) from the C1 checker for the rewritten CQ set b, and causing this CQ set to be rewritten once again.

The provision of the above-described RWW function in this type of system necessitates the provision of a history store for storing the history of CQ sets written to the magnetic tape so that it can determine whether a CQ set has been written to the tape and, if so, whether it has been rewritten and how many times, thereby ensuring that all CQ sets have been correctly written to the tape for reliable retrieval of the data when required.

In some systems, the history of CQ sets written to tape is stored in one or more large memory blocks which store the history of all CQ sets written to the tape, in the order in which they were written. When a CQ set is written to tape, it (or at least information identifying it) is stored in the history storage means. As explained above, each CQ set comprises 16 (2×8) codeword pairs.

When the information relating to a CQ set is written to the history storage tape, at least one bit is allocated to each codeword pair included therein, such bits being intended to indicate the quality of the codeword pairs as determined during the RWW process described above.

During the RWW process, the error checking block checks each codeword pair for errors and, in the event that an error is detected in a C1 codeword pair, returns a negative output and sets the quality bit in the history storage means to '0'. If no errors are detected in a C1 codeword pair, a positive output is returned by the error checking block and the quality bit in the history storage means is set to '1'. When all of the quality bits for a CQ set are set (or a predetermined number of write cycles have occurred or a predetermined amount of time has elapsed since the CQ set was written to the tape), the system checks the quality bits in the history storage means for that CQ set and, if any errors are indicated (i.e. if any of the quality bits are '0', then the CQ set is rewritten. Particular codeword quads are rotated across tracks (or channels) on each rewrite, to minimise the effect of a particularly bad track.

An example of such rotation is illustrated by the table in FIG. 6 in which a number of CQ sets are rewritten because an error was detected while they were being written. The notation K$^x$ indicates that an error was detected while writing CQ set K. The notation K' indicates that the CQ set K was rewritten once. The notation K" indicates that the CQ set K was rewritten twice, and so on. N is the set number within the data set.

Referring to FIG. 7 of the drawings, a write chain controller for use in an exemplary embodiment of the invention comprises an updater 10 which is the entity in charge of deciding which CQ set to write next to a magnetic tape cartridge (not shown) The selected CQ set is sent to a 'next ccp' block 12 for sequencing of CCP's within that CQ set. The 'next ccp' block 12 also requests further CQ sets as necessary.

Information relating to the selected CQ set is also stored in a history array 14, in case it needs to be rewritten later. The history array 14 is essentially a multiport memory, and this array together with the logic closest to it (not shown) form a history entity. Another entity, 'NEW CQ set' 16, provides the updater 10 with the next new CQ set to be written. However, if a previously written CQ set needs to be rewritten, then the updater 10 gives them priority over the new CQ sets.

A quality control block 18 analyses the error checking information returned for each CCP, and produces checkoff signals (to be described later) which are input to the history entity 16. A FWIF block 20 is intended to represent all of the other primary elements of the write chain controller.

As explained above, as soon as a CQ set has been written to the tape, the written data is read back and an error checker is used to check for errors in the CQ set. It checks the header of each CCP in the CQ set against the information stored in the history array. If a match is found, it checks for errors in the codewords of each CCP, and sets the rowqual bits in the history array for each CCP in the matching CQ set according to the result. In the event that the header information read back is corrupted, the rowqual bits for that particular codeword pair are set to 00. If the header information is found to be correct, but both codewords contain errors (or more than a predetermined number of errors), the rowqual bits are set to 01. If the header information is correct and one of the codewords in a codeword pair is good, the rowqual bits are set to 10. Finally, if the header information is correct and both codewords in a codeword pair are good, the rowqual bits are set to 11. This process is known as 'checkoff' and results in a series of 32 bits set to either 1 or 0.

The quality criteria by which a codeword is determined to be good or bad may be rigid, as in some conventional systems, whereby if a C1 codeword is found to have a single error it is marked as being bad. However, in a C1 codeword having 6 parity bytes, it is possible to detect and correct 3 bytes in error during data retrieval, and as such, a C1 codeword having 3 or less errors can be considered "good" because the error correction scheme used in the data retrieval apparatus can handle these.

Whether or not a CQ set needs to be rewritten is determined according to the number of rowqual bits set to '1' for a particular CQ set in the history array after a predetermined number (according to the latency value set for the system) of intervening CQ sets have been written. In the event that a CQ set is rewritten, its information overwrites the row of the history array which contains the information corresponding to the CQ set of which it is a rewrite.

Referring to FIG. 8 of the drawings, there is illustrated a control register for use in configuring the write chain controller described above with reference to FIG. 7 of the drawings. The 'WCC_CONTROL' register configures the write chain controller function settings. Once writing has commenced, the register should only be written for aborting the write operation. Some of the most relevant bits of the control register will now be described in more detail.

go: this bit must be set to 1 for the function to be operational. Writing a 0 here aborts the current operation, in which case no further interrupts or communication to C1 will occur and all state machines return to their idle state.

reserved_bit: this bit is copied into the reserved bit of every codeword pair header.

stric_rewrites: a 1 here means that a CQ set will only be considered good if all its CQ's are good on the same rewrite. Good CQ's from previous writes of a rewritten CQ set are forgotten (whereas in a conventional system, once a CQ set has been rewritten a maximum of n times, where n=no. of tracks−1, the CQ set is considered to be 'good' and will not be rewritten again). Setting this bit to 1 may cause extra rewrites because it significantly tightens the quality criteria.

latency: (also referred to as the 'rewrite distance') this is the number "L" of intervening CQ sets written between two consecutive instances of a rewritten CQ set. The maximum latency allowed by the industrial format referred to above is 6. The minimum latency which can be programmed into this embodiment of the present invention is dependent on the hardware implementation of the tape drive, but is generally of the order of 4 or 5 (although lower values may be programmed if required, particularly for test purposes). Before a new CQ set is written, the write chain controller checks that the CQ set L+1 CQ sets earlier is safely written to tape, i.e. all of its CQ's are considered to be good according to the programmed quality criteria. If not, the old CQ set is rewritten and the new one is delayed until after the rewrite(s).

In summary, in data transfer and storage operations such as that described above, there is a need to read data back from the tape on which it has been written, in order to determine whether that data needs to be rewritten to the tape because it has not been written to the tape with sufficient quality to ensure reliable retrieval of the data when required. Information relating to the blocks of data written to the tape is stored together with information output from the error checking block regarding the quality of each codeword pair in a block (or CQ set), according to some predetermined quality criteria. If a CQ in a CQ set is found to be 'bad' it is rewritten over and over again (the tracks on which each CQ is written being rotated for each rewrite) until the whole CQ set has been correctly written to the tape in a single rewrite, thereby substantially improving the quality of the stored data and reducing the probability that data cannot be recovered from the tape, when required. This feature is preferably entirely programmable for use when required.

Although the present invention has been described by way of examples of a preferred embodiment, it will be evident that other adaptations and modifications may be employed without departing from the scope of the invention as defined by the appended claims. Further, the terms and expressions employed herein have been used as terms of description and not of limitation; and, thus, there is no intent to exclude equivalents, but on the contrary it is intended to cover any and all equivalents which may be employed without departing from the scope of the invention as defined by the appended claims.

What is claimed is:

1. Apparatus for transferring data from a host computing system to one or more magnetic tape storage devices or the like, the apparatus comprising:
   an input apparatus for receiving data, dividing it into blocks, and converting said blocks of data to a format suitable for storage on said one or more storage devices;
   one or more data writers for writing said blocks of data in sets of a plurality of blocks to said one or more storage devices, data being adapted to be written to the one or more storage devices in codeword quad (CQ) sets comprising an array of ECC encoded codeword pairs;
   one or more data readers for reading back data written to said one or more storage devices and transferring said read data to error checking apparatus, said error checking apparatus being arranged to generate a negative output only if a block of data includes an error and/or more than a predetermined number of errors;
   a control apparatus for causing said one or more data writers to rewrite a set of blocks of data to said one or more storage devices in response to a negative output from said error checking apparatus, until all of the blocks of data in that set are written without error (or with fewer than a predetermined number of errors) during the same rewrite; and
   a history store for storing information relating to at least some of the CQ sets written to the one or more storage devices, together with information corresponding to the output of the error checking apparatus for each codeword pair of the set.

2. Apparatus according to claim 1, wherein each CQ set is identified in the history store by a plurality of bits of data, including at least two row quality bits per codeword pair.

3. Apparatus according to claim 2, wherein the row quality bits for each codeword pair are both set to 0 when a CQ set is first written to the one or more storage devices.

4. Apparatus according to claim 3, including a detection apparatus for determining whether the header of a read codeword pair is correct and, if so, whether each codeword is good or bad, depending on the number of errors they contain, the apparatus further comprising apparatus for setting the row quality bits to indicate the result of such error checking.

5. Apparatus according to claim 4, wherein the row quality bits are set to 00 if the header of the codeword pair is corrupted (so that the codeword pair cannot be identified), 01 if the header is correct but both codewords are bad, 10 if the header is correct but only one of the codewords is good, and 11 if the header is correct and both codewords are good.

6. Apparatus according to claim 1, comprising a plurality of tracks by means of which a number of blocks of data are simultaneously written across said one or more storage devices.

7. Apparatus according to claim 6, wherein said error checking apparatus comprises a number of parallel read heads for simultaneously reading back a number of blocks of data written to said one or more storage devices.

8. Apparatus according to claim 6, comprising eight parallel tracks.

9. Apparatus according to claim 7, comprising eight parallel read heads.

10. Apparatus according to claim 1, wherein said at least one data reader is positioned such that it follows said at least one data writer and is arranged to read back data just written to said one or more storage devices, whilst data is still being written to said one or more storage devices.

11. Apparatus for transferring data from a host computing system to one or more tape storage devices or the like, the apparatus comprising:
   an input apparatus for receiving data, dividing it into blocks, and converting said blocks of data to a format suitable for storage on said one or more storage devices;
   one or more data writers for writing said blocks of data in sets of a plurality of blocks to said one or more storage devices;
   one or more data readers for reading back data written to said one or more storage devices and transferring said read data to error checking apparatus, said error checking apparatus being arranged to generate a negative output only if a block of data includes an error and/or more than a predetermined number of errors;
   a control apparatus for causing said one or more data writers to rewrite a set of blocks of data to said one or more storage devices in response to a negative output from said error checking apparatus, until all of the blocks of data in that set are written without error (or with fewer than a predetermined number of errors) during the same rewrite; and
   a control register having 1 or more bits which can be set by a user to cause a set of blocks of data or CQ set to always be rewritten unless all of its blocks of data or codewords are good, regardless of previous rewrites.

12. Apparatus according to claim 11, wherein the control register includes 4 bits.

13. A method of transferring data from a host computing system to one or more tape storage devices or the like, the method comprising the steps of:
   receiving data and dividing it into blocks;
   converting said blocks of data to a format suitable for storage on said one or more storage devices;
   writing said blocks of data in sets of a plurality of blocks to said one or more storage devices;
   reading back data written to said one or more storage devices and transferring said read data to error checking apparatus, said error checking apparatus being arranged to generate a negative output if a block of data includes an error and/or more than a predetermined number of errors;
   rewriting a set of blocks of data to said one or more devices in response to a negative output from said error checking apparatus until all of the blocks of data in that set are written without error during the same rewrite;
   writing the data to the tape in codeword quad (or CQ) sets comprising an array of ECC encoded codeword pairs; and
   storing in a history store information relating to at least some of the CQ sets written to the one or more storage devices together with information corresponding to the output of the error checking apparatus for each codeword pair of the set.

14. A method according to claim 13, further comprising the step of identifying each CQ set in the history store by a plurality of bits of data, comprising at least two 1 valid bit, 32 row quality bits per codeword pair.

15. A method according to claim 14, further comprising the step of setting both of the row quality bits for each codeword pair to 0 when a CQ set is first written to the one or more storage devices.

16. A method according to claim 15, further comprising the steps of determining whether the header of a read codeword pair is correct and, if so, whether each codeword is good or bad, depending on the number of errors they contain, and setting the row quality bits to indicate the result of such error checking.

17. A method according to claim 16, wherein the row quality bits are set to 00 if the header of the codeword pair is corrupted (so that the codeword pair cannot be identified), 01 if the header is correct but both codewords are bad, 10 if the header is correct but only one of the codewords is good, and 11 if the header is correct and both codewords are good.

18. A method according to claim 13, wherein said error checking apparatus is arranged to generate a negative output if a block of data includes more than a predetermined number of errors.

19. A method of transferring data from a host computing system to one or more tape storage devices or the like, the method comprising the steps of:

receiving data and dividing it into blocks;

converting said blocks of data to a format suitable for storage on said one or more storage devices, writing said blocks of data in sets of a plurality of blocks to said one or more storage devices;

reading back data written to said one or more storage devices and transferring said read data to error checking apparatus, said error checking apparatus being arranged to generate a negative output if a block of data includes an error and/or more than a predetermined number of errors;

rewriting a set of blocks of data to said one or more devices in response to a negative output from said error checking apparatus until all of the blocks of data in that set are written without error (or with fewer than a predetermined number of errors) during the same rewrite; and providing a control register including 1 or more bits which can be set by a user to cause a set of blocks of data or CQ set to always be rewritten unless all of its blocks of data or codewords are good, regardless of previous rewrites.

20. A method according to claim 19, wherein the control register includes 4 bits.

21. A method of supplying data to one or more tape storage devices or the like, the method comprising the steps of:

dividing the data into blocks;

converting said blocks of data to a format suitable for storage on said one or more storage devices;

writing said blocks of data in sets of a plurality of blocks to said one or more storage devices;

reading back data written to said one or more storage devices and error checking said read data by generating a first output if a block of data includes an error;

rewriting a set of blocks of data to said one or more devices in response to the first output from said error checking step until all of the blocks of data in that set are written without error during the same rewrite;

writing the data to the tape in codeword quad (or CQ) sets comprising an array of EGG encoded codeword pairs; and storing information relating to at least some of the CQ sets written to the one or more storage devices together with information corresponding to the output of the error checking apparatus for each codeword pair of the set.

22. Apparatus for performing the method of claim 21.

23. A method of supplying data to one or more tape storage devices or the like, the method comprising the steps of:

dividing the data into blocks;

converting said blocks of data to a format suitable for storage on said one or more storage devices;

writing said blocks of data in sets of a plurality of blocks to said one or more storage devices;

reading back data written to said one or more storage devices and error checking said read data by generating a first output if a block of data includes more than a predetermined number of errors;

rewriting a set of blocks of data to said one or more devices in response to the first output from said error checking step until all of the blocks of data in that set are written with fewer than a predetermined number of errors during the same rewrite;

writing the data to the tape in codeword quad (or CQ) sets comprising an array of ECC encoded codeword pairs; and storing information relating to at least some of the CQ sets written to the one or more storage devices together with information corresponding to the output of the error checking apparatus for each codeword pair of the set.

24. Apparatus for performing the method of claim 23.

* * * * *